United States Patent
Hunt

(12) 
(10) Patent No.: US 6,735,012 B2
(45) Date of Patent: May 11, 2004

(54) SYSTEM FOR PHASE MODULATING AN INCOMING OPTICAL WAVEFRONT

(75) Inventor: Jeffrey Hunt, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 9 days.

(21) Appl. No.: 10/104,683

(22) Filed: Mar. 22, 2002

(65) Prior Publication Data

US 2003/0179433 A1 Sep. 25, 2003

(51) Int. Cl.$^7$ ................................................. G02F 1/01
(52) U.S. Cl. .................... 359/279; 359/245; 359/246
(58) Field of Search ............................... 359/246, 279, 359/237, 245, 248, 251, 589, 590

(56) References Cited

U.S. PATENT DOCUMENTS

| | | | |
|---|---|---|---|
| 4,784,476 A | * 11/1988 | Schulman et al. | 359/245 |
| 5,157,537 A | * 10/1992 | Rosenblatt | 359/248 |
| 5,337,183 A | * 8/1994 | Rosenblatt | 359/248 |
| 5,396,364 A | 3/1995 | O'Meara et al. | 359/292 |
| 5,521,743 A | 5/1996 | Holmes et al. | 359/248 |
| 5,917,568 A | * 6/1999 | Johnson et al. | 349/116 |
| 6,222,667 B1 | 4/2001 | Gobeli | 359/323 |

OTHER PUBLICATIONS

Y. Jiang, et al; $2^{nd}$–Harmonic Generation from Silicon Nanoclusters Embedded In $SIO_2$; Applied Physics Letters; Feb. 5, 2001; vol 78, No. 6; pp. 766–768.

* cited by examiner

*Primary Examiner*—Ricky Mack
(74) *Attorney, Agent, or Firm*—Ingrassia Fisher & Lorenz, P.C.

(57) ABSTRACT

An active optical system and method for phase-shifting desired portions of an incoming optical wavefront. A control optics assembly receives an incoming optical wavefront and adjusts that incoming optical wavefront in accordance with first desired wavelength and beam propagation parameters. Spatial light modulator (SLM) addressing optics receives the control optics output wavefront and produces a desired beam size therefrom. An SLM receives the output from the SLM addressing optics and provides localized phased shifting of the resulting wavefront. The SLM comprises a microscopic array of pixelated silicon nanocluster elements and a voltage source for applying independently controlled voltages on desired nanocluster elements. SLM egressing optics receives the output of the SLM and returns the beam size of the wavefront to the initial beam size. The output of the SLM egressing element has desired portions of its phase shifted relative to the incoming optical wavefront.

15 Claims, 2 Drawing Sheets

SYSTEM FOR PHASE MODULATING AN INCOMING OPTICAL WAVEFRONT

BACKGROUND OF THE INVENTION

1. Field of the Invention

This invention relates to active optical systems and more particularly to an active optical system for phase-shifting desired portions of an incoming optical wavefront.

2. Description of the Related Art

Many types of active optical systems require the control of the optical wavefront or phase of a propagating laser beam. When an image propagates through turbid media, for example, the atmosphere, random fluctuations in the local index of refraction cause local fluctuations in the optical path length that the beam traverses. These fluctuations in path length lead to a randomization of the phase front contour, causing the image to be obscured. Using an adaptive optics or active optical control, the original phase state is restored, allowing the reconstruction of the original image. In the case of optical communications, the same kind of randomization can occur. In this case, the adverse result is that the optical beam cannot be focussed to a diffraction limited (limited by wavelength) spot, causing loss of information when the beam is introduced into a small diameter optical element, for example, an optical fiber. Active control and adaptive optics in this scenario allows one to reconstruct the original phase state so that the beam can be focussed to a small spot without loss of information. Typically, active optical systems make use of adaptive optical elements that are based on mechanical implementation. One example of this is a deformable mirror. The mirror contains a number of small actuators that push or pull on the mirror surface. In doing so, they compensate for the distortions in the beam phase by making some parts of the optical path shorter and some parts of the optical path longer. However, this implementation takes what is fundamentally an optical problem and turns it into a mechanical problem. It is desirable to use a non-mechanical system to accomplish the phase-shifting needed to recreate the original phase state of the optical beam.

There have been previous patents to use electro-optical means to perform adaptive optical processes. U.S. Pat. No. 5,396,364, entitled CONTINUOUSLY OPERATED SPATIAL LIGHT MODULATOR APPARATUS AND METHOD FOR ADAPTIVE OPTICS, issued to O'Meara et. al, discusses the use of a spatial light modulator for electro-optically addressed adaptive optics. A standard SLM is described, that incorporates an electronically "pixelated" modulator. The device incorporates a microlenslet array to physically separate the wavefront into small active areas that form the pixels. This device has several disadvantages. The electronic structure must be built directly into the device, causing greater difficulty in manufacture and limiting the resolution of the device to the number of electronic structures created.

U.S. Pat. No. 6,222,667, entitled ELECTRO-OPTIC LIGHT VALVE ARRAY, issued to Gobeli et, discloses a two-dimensional light valve array. It uses a pixelated substrate made of lanthanum modified zirconate-titanate. Electrodes are cut into recesses made in the substrate. Voltages which are applied to the individual pixels induce bi-refringence into the pixelated regions. Electronic control of the bi-refringence affects the light transmittance. The inventor does not discuss control of phase or wavefront in this device. The lanthanum zirconate-titanate material is expensive and difficult to manufacture. While its electro-optical response is reasonable for the application, small inconsistencies will cause deterioration in its performance.

SUMMARY

The present invention is an active optical system and method for phase-shifting desired portions of an incoming optical wavefront. A control optics assembly receives an incoming optical wavefront and adjusts that incoming optical wavefront in accordance with first desired wavelength and beam propagation parameters. The spatial light modulator (SLM) addressing optics receives the control optics output wavefront and produces a desired beam size therefrom. An SLM receives the output from the SLM addressing optics and provides localized phased shifting of the resulting wavefront. The SLM comprises a microscopic array of pixelated silicon nanocluster elements and a voltage source for applying independently controlled voltages on desired nanocluster elements. SLM egressing optics receives the output of the SLM and returns the beam size of the wavefront to the initial beam size. The output of the SLM egressing element has desired portions of its phase shifted relative to the incoming optical wavefront.

The present invention performs phase control on an optical wavefront without utilizing a deformable mirror to compensate for phase distortions produced by atmospheric conditions. By altering the manner in which the imaging device is addressed, the local refractive index of the two-dimensional medium can be used to modulate or demodulate the wavefront at a single position within the wavefront. This results in a phase compensated wavefront.

DETAIL DESCRIPTION OF THE PREFERRED EMBODIMENTS

Figure 1:
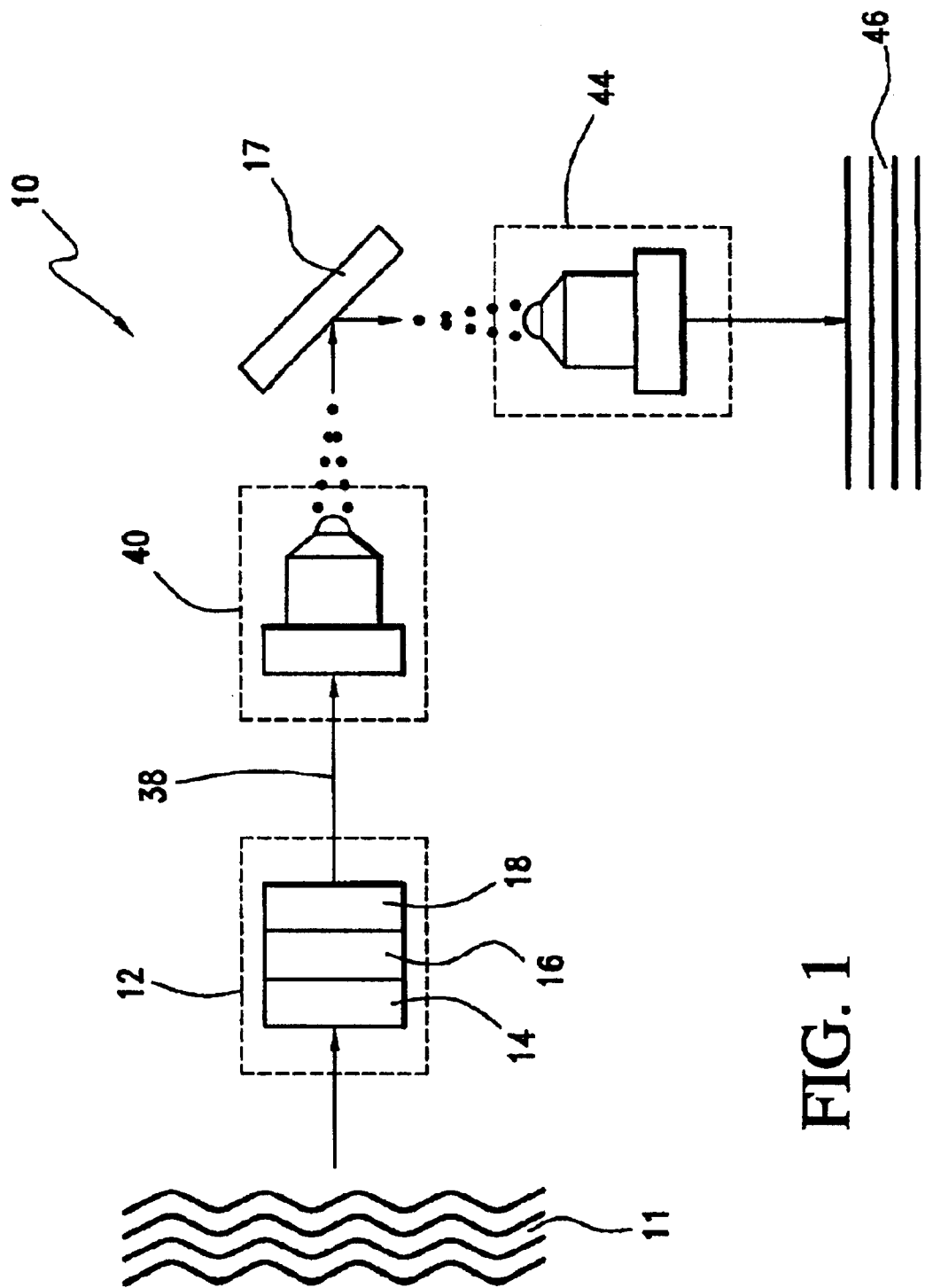
FIG. 1 is a schematic view of a preferred embodiment of the active optical system of the present invention.

Referring to the drawings and the characters of reference marked thereon FIG. 1 illustrates a preferred embodiment of the present invention, designated generally as 10. An incoming optical wavefront 11 is received by a first control optics assembly, designated generally as 12. The wavefront of an optical beam is generally described as the contour of constant phase over the physical cross-section of the beam. Although any optical source will have a phase associated with it, in most cases, sources will be objects that are being imaged or will be from transmitters of digitally encoded optical beams.

A control optics assembly 12 adjusts the incoming optical wavefront 11 in accordance with desired wavelength and beam propagation parameters. These parameters could include, for example, precise wavelength filtering to the expected signal wavelength, the optical bandwidth of the incoming signal, or the polarization of the light. The wavelength may be controlled to fit within the detection range of the photodiode. It may be more precisely filtered to fit a known input signal, either from an image or from a digitally encoded communication beam. The present invention operates with wavelengths longer than 1 micron. The preferred minimum wavelength is about 1.1 micron. The device will be opaque at optical signals at shorter wavelengths and therefore light at these shorter wavelengths should be eliminated.

The assembly 12 preferably includes wavelength control element 14 such as a color filter, an etalon, a Fabry-Perot interferometer, a Fizeau interferometer, a diffraction grating, or a notch filter, etc. A polarization control element 16 polarizes the wavefront. This may comprise, for example, a polarization plate, a Brewster's angle polarizer, or a thin film polarizer. The precise polarizer to be selected depends on the particular application's engineering requirements such as polarization rejection ratio, size and weight of the polarizer, and the wavelength range over which the detector must operate, etc. The wavefront is then received by a propagation control element 18 such as a single lens, double lens, refractive elements, reflective elements or other system up to a fully engineered telescope.

To provide the correct beam size for matching the spatial light modulator (SLM), SLM addressing optics 40 are provided. The SLM addressing optics 40 may include, for example, a plurality of lenses or curved reflectors. Typically, the SLM 17 will be on the order of 10 millimeters in diameter, although this may vary somewhat depending on the application. The active area of the SLM 17 is the only place where the desired phase-shifting physical effect can take place. Consequently, this step is essential to assure that the affected beam enters that area of the detector.

The SLM 17 receives the output from the SLM addressing optics 40 and provides localized phased shifting of the resulting wavefront, as will be described in greater detail below. SLM egressing optics 44 receives the output of the SLM 17 and returns the beam size of the wavefront to the initial beam size, i.e. the beam size of output 38. The resulting waveform 46 has desired portions of its phase shifted relative to the incoming optical wavefront 10. Further optical processes may require a beam diameter that differs from that required for the SLM. These optics allow for the modification of the beam diameter or spot size.

Figure 2:
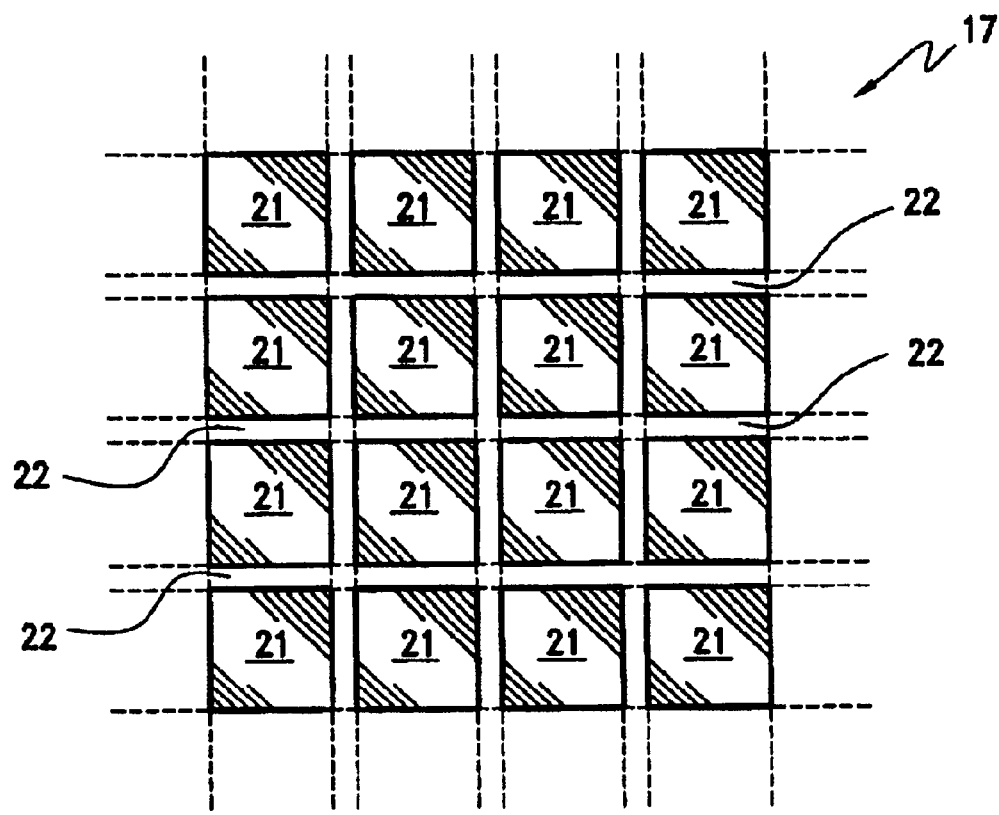
FIG. 2 is a face-on view of the pixelated silicon nanocluster structure on an SLM.

Referring now to FIG. 2, a face-on view of a preferred embodiment of the SLM 17 is illustrated. SLM 17 includes a microscopic array of pixelated silicon nanocluster elements 21. The pixelated elements 21 provide phase modulation of the optical wavefront. To electrically isolate the pixels, there are optically inactive regions 22 between the pixel elements 21. These regions 22 are formed of a material that is both optically inactive and electrically insulative. Examples of such materials are Infrasil™, calcium flouride, potassium fluoride and magnesium fluoride. This figure is very schematic so as to show the regions 22. In an actual implementation, the regions 22 will be much more narrow so that more of the optical wavefront will impinge on an optically active area. Furthermore, although square pixels are shown in a rectilinear array, it is understood that various other geometries could be used. For example, rectangles could be used. Furthermore, other array shapes could be used.

Figure 3:
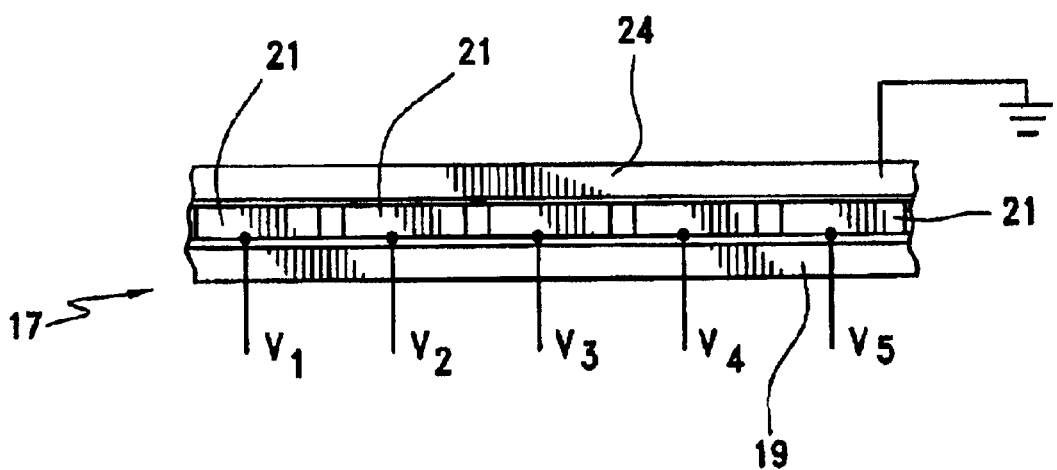
FIG. 3 is a cross-sectional view of the pixelated silicon nanocluster structure of FIG. 2.

Referring now to FIG. 3, the SLM 17 is shown in cross-section. The pixelated elements are supported on a support element 19. The support element may be formed of optically inactive, electrically insulative material such as that used for regions 22 or other suitable support material such as, for example, sapphire, glass, quartz, or magnesium flouride.

In order to control the optical path length through each pixel element 21, the index of refraction is modulated by applying a voltage to each pixel as represented in the Figure, by $V_1$–$V_5$. A common electrode 24 is supported by the pixel elements 21 and provides the "ground" for these pixel elements 21. A larger voltage will represent a larger index modulation. The common electrode is formed of a suitable conductive, nonelectroptically active structures such as ZnOx $CuYO_2$, $CuFeO_2$ or $CuCrO_2$ films. The thickness of the silicon nanocluster elements 21 will depend upon the particular implementation. Since the strength of the effect depends on both the thickness and voltage, there will be some optimization of the combination, depending on the nature of the distortion to be addressed.

In order to determine whether there is enough physical response to make the system practical, an estimate of the magnitude of the electro-optical response is determined. The general form of the electro-optical response is:

$$\frac{1}{n_{ij}^2(\vec{E}_0)} = \frac{1}{(n_{ij}^2)_o} + \sum_k r_{ijk} E_{0k} + \ldots$$

where $$\frac{1}{n_{ij}^2(\vec{E}_0)}$$

is the index of refraction ellipsoid, which is a function of $\vec{E}_o$, the applied electric field. The first term to the right is the static ($\vec{E}_o$=0) refractive index. The second term in the expansion is the electric field (or applied voltage) dependent term. In a nominally active electro-optic medium, $r_{ijk}$ are on the order $10^{-10}$–$10^{-8}$ cm/V.

The microscopic responses of a material to a static electric field (static applied voltage) arise from the same microscopic considerations as alternating electric field (from electromagnetic radiation). Consequently, a material that has a good second harmonic susceptibility, $X^{(2)}(2\omega=\omega+\omega)$, will have a good electro-optical response, so long as the correct microscopic non-linearities are involved. For example, KDP (potassium dihydrogen phosphate) has an effective susceptibility on the order $X^{(2)} \approx 10^{-9}$ esu. Simultaneously, its $r_{ijk}$ coefficient is approximately $10^{-8}$ cm/V, making an excellent electro-optical material. By comparison, recent work with silicon nanocluster embedded $SiO_2$ has shown good second harmonic susceptibilities. (Such recent work has been conducted by Y. Jiang et al, Second-harmonic generation from silicon nanocluster embedded in $SiO_2$, Applied Physics Letters, Vol. 76, No. 6, Feb. 5, 2001, page 766.) The microscopic non-linear responses that give rise to good second harmonic susceptibilities will give rise to good $r_{ijk}$ coefficients, so that the silicon nanoclusters will have electro-optical responses comparable to KDP and like materials.

The pixelated change in the index of refraction causes a localized change in the optical path length at that position in the wavefront. Consequently, as each part of the optical wavefront propagates through the silicon nanocluster pixel element 21, each wavefront section will experience a change in optical path length. The wavefront will then be phase-shifted at the position in question as a result of the optical path length change.

Since the estimates for the terms in the electro-optics tensor $r_{ijk}$ are similar to those for typical electro-optical materials (e.g. KDP) the driving voltages will be approximately the same. In the electrical configuration specified in FIG. 3, electric fields of 1 kilovolt per centimeter are needed to produce optical path length changes on the order of a wave. As the thicknesses drop, the driving voltages will drop proportionately. In the present configuration, thicknesses of 100 microns to 1 millimeter are sufficient, so that the actual applied voltages are on the order of 10 to 100 volts.

This present invention can be used in a number of optical applications. For example, suppose a user is imaging an object through a long distance in the atmosphere. Without a phase correction, the image will be smeared out and its features may be unresolvable. With the present active phase corrector in place, the scrambled optical phase can be reconstructed to its original condition before the atmosphere introduced aberrations. Another use is for long-distance optical communications. When an optical signal is received, it is introduced into an optical fiber for signal handling and processing. Unfortunately, phase distortions will not allow the beam to be focused to a small spot, so that not all the signal will go into the fiber, causing a loss of encoded information. Phase correction enables the entire optical signal to be focused into the fiber. In optical microlithography used in semiconductor processing, it is essential to hold the laser to a small controlled focus spot. The environment in which the processing occurs causes huge distortions to occur and phase control is essential for good yields. This device can be used in that environment to compensate for phase distortions that are caused there. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

What is claimed is:

1. An active optical system for phase-shifting desired portions of an incoming optical wavefront comprising
   a) a control optics assembly for receiving an incoming optical wavefront and adjusting that incoming optical wavefront in accordance with desired wavelength and beam propagation parameters:
   b) spatial light modulator (SLM) addressing optics for receiving an output from the control optics assembly and producing a desired beam size therefrom;
   c) an SLM for receiving the output from the SLM addressing optics and providing localized phased shifting of the resulting wavefront said SLM comprising:
      a microscopic array of pixelated silicon nanocluster elements; and
      a voltage source for applying independently controlled voltages on desired nanocluster elements; and
   d) SLM egressing optics for receiving the output of the SLM and returning the beam size of the wavefront to the initial beam size, the output of the SLM egressing optics having desired portions of its phase shifted relative to the incoming optical wavefront.

2. The active optical system of claim 1 wherein said control optics assembly comprises
   a) a wavelength control element for receiving the incoming optical wavefront and
   b) a propagation control element for receiving the output of the wavelength control element and providing an output to said SLM addressing optics.

3. The active optical system of claim 2, wherein said control optics further includes a first polarization control element.

4. The active optical system of claim 1, wherein said control optics assembly further includes a second polarization control element.

5. The active optical system of claim 1, wherein said SLM composes a support element for supporting said pixelated elements.

6. The active optical system of claim 1, wherein said support element comprises an optically inactive, electrically insulative material.

7. The active optical system of claim 1, wherein said SLM comprises a common electrode supported by said pixelated elements.

8. An active optical system for phase-shifting desired portions of an incoming optical wavefront comprising
   a) a control optics assembly for receiving an incoming optical wavefront and adjusting that incoming optical wavefront in accordance with desired wavelength and beam propagation parameters
   b) spatial light modulator (SLM) addressing optics for receiving an output from the control optics assembly and producing a desired beam size therefrom,
   c) an SLM for receiving the output from the SLM addressing optics and providing localized phased shifting of the resulting wavefront said SLM, comprising:
      i) a support element comprising an optically inactive, electrically insulative material
      ii) a microscopic array of pixelated silicon nanocluster elements supported by said support element
      iii) a common ground supported by said pixelated silicon nanocluster elements; and
      iv) a voltage source for applying independently controlled voltages on desired nanocluster; and
   d) SLM egressing optics for receiving the output of the SLM and returning the beam size of the wavefront to the initial beam size, the output of the SLM egressing optics having desired portions of its phase shifted relative to the incoming optical wavefront.

9. The active optical system of claim 1, wherein said support element comprises an optically inactive electrically insulative material.

10. The active optical system of claim 1, wherein said microscopic array of pixelated silicon nanocluster elements comprises a rectilinear array.

11. The active optical system of claim 1, wherein said SLM comprises optically inactive regions between said of pixelated silicon nanocluster elements.

12. A method for or phase-shifting desired portions of an incoming optical wavefront, comprising the steps of
   a) adjusting an incoming optical wavefront in accordance with desired wavelength and beam propagation parameters,
   b) producing a desired beam size for the adjusted optical wavefront
   e) providing localized phased shifting of the beam size modified adjusted optical wavefront utilizing a microscopic array of pixelated silicon nanocluster elements; and
   f) returning the phase shifted wavefront to its initial beam size the resulting optical wavefront having desired portions of its phase shifted relative to the incoming optical wavefront receiving the incoming optical wavefront, a propagation control element for receiving the output of the wavelength control element and a polanzation control element for receiving the output of said first propagation control; element
   b) spatial light modulator (SLM) addressing optics for receiving an output from said control optics assembly and producing a desired beam size therefrom,
   c) an SLM for receiving the output from the SLM addressing optics and providing localized phased shifting of the resulting wavefront, said SLM comprising a microscopic array of pixelated silicon nanocluster elements and a voltage source for applying independently controlled voltages on desired nanocluster elements and, d) SLM egressing optics for receiving the output of the SLM and returning the beam size of the wavefront to the initial beam size the output of the SLM egressing element having desired portions or its phase shifted relative to the incoming optical wavefront.

13. The method of claim 12, wherein said step of adjusting said incoming optical wavefront comprises:

utilizing a first wavelength control element for receiving the incoming optical wavefront, and, utilizing a first propagation control element for receiving the output of the first wavelength control element.

14. An active optical system for phase-shifting desired portions of an incoming optical wavefront, comprising:

a) a control optics assembly for receiving an incoming optical wavefront and adjusting that incoming optical wavefront in accordance with desired wavelength and beam propagation parameters, said control optics comprising a wavelength control element for receiving the incoming optical wavefront, a propagation control element for receiving the output of the wavelength control element and a polarization control element for receiving the output of said first propagation control element, b) spatial light modulator (SLM) addressing optics for receiving an output from said control optics assembly and producing a desired beam size therefrom, c) an SLM for receiving the output from the SLM addressing optics and providing localized phased shifting of the resulting wavefront said SLM comprising a microscopic array of pixelated silicon nanocluster elements and a voltage source for applying independently controlled voltages on desired nanocluster elements and d) SLM egressing optics for receiving the output of the SLM and returning the beam size of the wavefront to the initial beam size the output of the SLM egressing element having desired portions of its phase shifted relative to the incoming optical wavefront.

15. An optical system for phase shifting a desired portion of an incoming optical wavefront having an initial beam size, the active optical system comprising:

a control optics assembly configured to receive the incoming optical wavefront and to produce an adjusted beam therefrom;

addressing optics configured to receive the adjusted beam and to produce a resulting wavefront having a desired beam size different from the initial beam size;

a spatial light modulator (SLM) configured to receive the resulting wavefront from the addressing optics, wherein the SLM comprises a microscopic array of pixelated silicon nanocluster elements and a voltage source configured to apply independently-controlled voltages to selected ones of the nanocluster elements to thereby provide localized phase shifting of the resulting beam; and egressing optics configured to restore the initial beam size of the resulting beam to thereby produce an output waveform of the optical system, wherein at least a portion of the output waveform is phase shifted relative to the desired portion of the incoming optical wavefront.

* * * * *

UNITED STATES PATENT AND TRADEMARK OFFICE
CERTIFICATE OF CORRECTION

PATENT NO.  : 6,735,012 B2
DATED       : May 11, 2004
INVENTOR(S) : Jeffrey Hunt It is certified that error appears in the above-identified patent and that said Letters Patent is hereby corrected as shown below:

Column 6,
Line 2, delete "composes" and add -- comprises --;
Lines 62-67, delete all lines;

Column 7,
Lines 1-9, delete all lines.

Signed and Sealed this

Thirtieth Day of November, 2004

JON W. DUDAS
*Director of the United States Patent and Trademark Office*